3,386,585
FILTER HOLDER AND SUPPORT
John E. Weyand, Needham, and Alfred S. Kent, Concord, Mass., assignors to Millipore Corporation, a corporation of Massachusetts
Filed Nov. 9, 1965, Ser. No. 506,952
7 Claims. (Cl. 210—445)

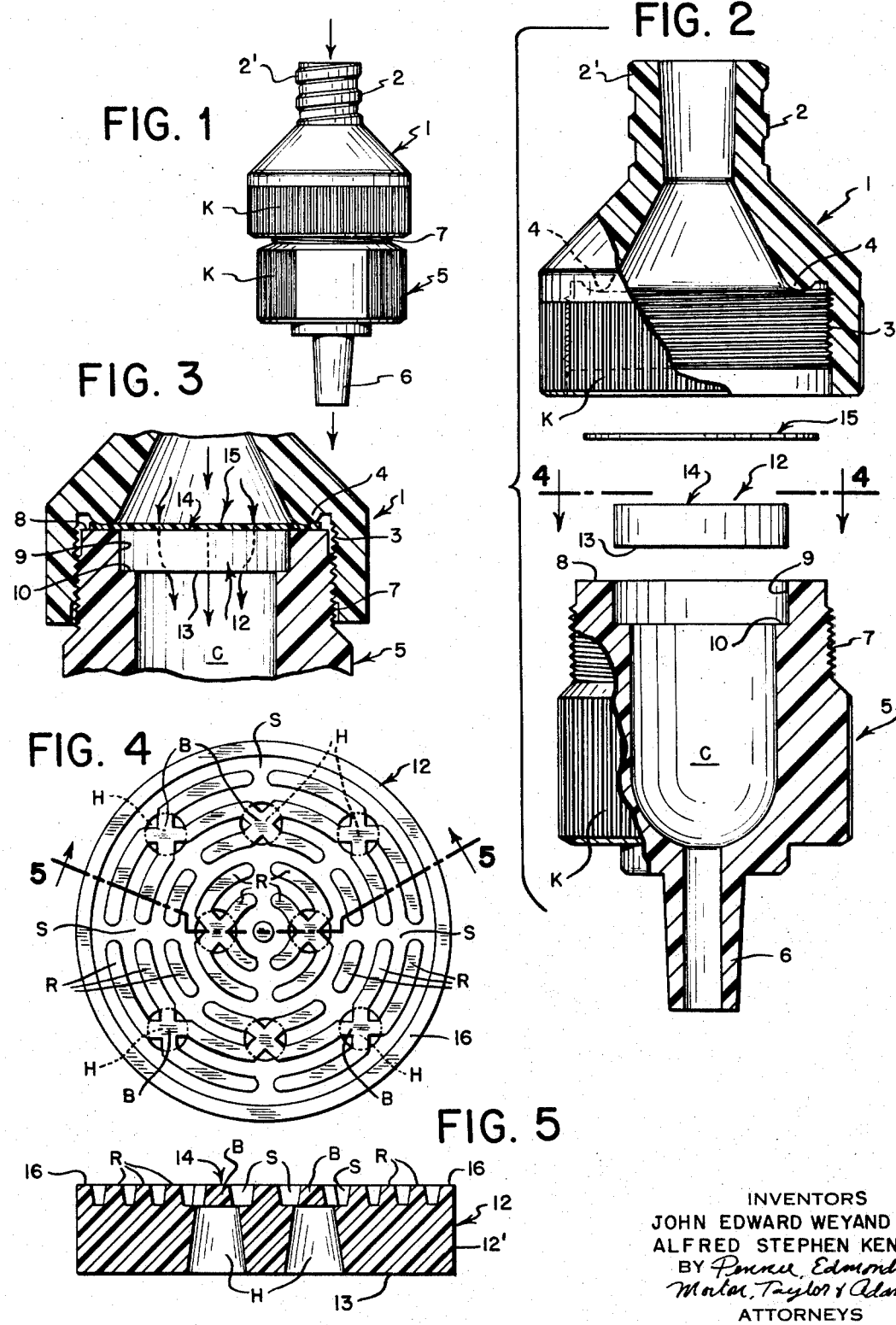

ABSTRACT OF THE DISCLOSURE

A filter holder unit comprising a female part having a hollow interior, a complementary shaped male part having a hollow interior and adapted to be connected to the female part, a filter support disposed internally between the male and female parts and having rib means thereon for supporting a filter, said rib means bridging outlet holes in said support, and opposed sealing surfaces disposed internally of said parts for sealing the filter to the filter support upon connection of the female and male parts together.

---

This invention relates to filter holders for securing therein a microporous plastic membrane filter and provides a filter holder which consists of two securely-connected molded plastic male and female parts, an inserted molded plastic perforate filter support for the membrane filter, and a filter holder unit consisting of said filter holder and a membrane filter on the filter support. The filter holder unit is constructed for connection to a duct system through which the fluid to be filtered is passed, for example, a hypodermic syringe.

The female part has an inlet connecting member such as a Luer for connection to a hypodermic syringe or the like, and an integral sealing ring which bears on and seals the membrane filter. The male part has the perforate filter support secured therein and an outlet connecting member such as may be used to attach to a hypodermic needle. One important feature of the filter holder is the molded plastic support for the membrane filter which has a flat grid surface supporting the filter and providing sufficient permeability to permit practically unrestricted flow. The integral sealing ring bears on the peripheral part of the membrane filter and presses it into sealing contact with a flat annular surface on the male part surrounding the filter support.

The filter support of the invention is advantageously injection molded, for example, of polypropylene and is of such low cost that it is disposable after one use. It can be efficiently constructed of materials which can be autoclaved without damaging the unit and thus presterilized so that no cleaning, assembly or sterilization are required prior to use.

These and other novel features of the invention will be better understood after considering the accompanying drawings and the following discussion.

FIG. 1 is a side view of the filter holder;
FIG. 2 is an enlarged, exploded side view of the filter holder of FIG. 1 with parts in section;
FIG. 3 is a fragmentary sectional view of a filter holder unit consisting of the filter holder of FIG. 1 and a membrane filter;
FIG. 4 is a plan view of the filter support, and
FIG. 5 is a sectional view at 5—5 of FIG. 4.

The filter holder shown in the drawing is formed of any suitable plastic such as by the injection molding of polypropylene. Although the embodiment of the invention illustrated is for use in a hypodermic syringe, it is to be understood that other Luer taper coupling or connecting means may be used depending on the duct system to which it is connected. The female part 1 has on the inlet end a Luer Lok 2 for connection to any source of fluid such as a hypodermic syringe having Luer fittings. The Luer Lok 2 has a continuous double thread 2' which effects a locked connection with a syringe. The female part has a hollow interior for the free flow of fluid, an interior threaded section 3, and an integral rounded ring-like sealing member 4.

The male part 5 has an outlet end 6 in the form of a Luer slip-connection for connection to a receiving device such as a hypodermic needle and has a hollow interior for the free flow of fluid. The opposite end has exterior threads 7 for connection to the threaded part of the female part 1 and a flat annular surface 8. The cylindrical recess 9 has a flat shoulder 10 on which the filter support 12 rests when mounted in the recess as shown in FIG. 3.

The filter support 12 is cylindrical to fit snugly in the recess 9, has a body section 12', a flat under surface 13 which rests on the shoulder 10 and a flat grid support surface 14 on which the membrane filter 15 rests. The surface 14 has an exterior annular rib 16 and a plurality of concentric segmental ribs R which support the filter 15. The space S inside the rib 16 and between the ribs R forms a continuous channel means and this space connects to a plurality of holes H which provide passageways for the flow of fluid from the filter and the space S into the chamber C and out the end 6. With reference to FIGS. 3, 4 and 5 it will be seen that the adjacent segmental ribs R cross over the holes H forming bridges B which support the filter while permitting fluid to flow thereunder.

The filter holder unit shown in FIG. 3 comprises the male and female parts 1 and 5 in threaded connection with the filter support 12 in the recess 9, bearing on the shoulder 10, and a microporous plastic membrane filter 15 overlying the support 12. It will be noted that the top surface of support 12 mates evenly with flat surface 8 in a single plane and that the membrane filter lies flat on this plane and is pressed into tight sealed contact with flat surface 8 by the sealing ring 4. The rounded surface of the ring-like sealing member 4 produces a substantially line bearing contact with said filter as opposed to that produced by flat sealing surfaces and thus effects a high sealing pressure. In order to facilitate assembly the two parts 1 and 5 have exterior knurling K to enable them to be screwed tightly together by hand.

Microporous plastic membrane filters suitable for use in the filter holder unit are made by the Millipore Filter Corporation and may have pore sizes varying from 0.01 to 14.0 microns and a total pore volume of about 80% of the filter volume. Such filters are very delicate and the filter support not only supports it without rupture but permits a high rate of flow.

The filter support may be removed for inspection or other purposes and since it is a separate element it enables the male part 5 to be injection molded. The sealing means eliminates the need for separate sealing components such as O-rings and avoids gaskets and the resulting misalignment, and also provides a high sealing engagement effectively sealing the edge of the delicate membrane filter without damage.

The filter holder unit is easy to assemble and sterilize and, since the cost is low, it may be discarded after use, thereby eliminating the possibility of cross-contamination and clean-up time. This unit would have application in many fields, but its strongest advantages would be realized in the pharmaceutical area, radiochemicals, and in the filtration of hard to clean-up fluids, such as photosensitive resists.

We claim:
1. A filter holder unit comprising a female part hav- ing an inlet coupling, a female end, a hollow interior for the flow of fluid and an interior integral sealing ring disposed within said female end and facing outwardly thereof; a male part having a hollow interior for the flow of fluid, a male end complementary to the female end of said female part, and a recess in the male end of the male part disposed inwardly of the outer periphery thereof and defining a flat sealing surface surrounding said recess; and a perforate rigid filter support having a size complemnetary to that of said recess, said filter support being mounted in the recess with its exposed surface lying in the plane of said flat sealing surface for supporting a microporous plastic membrane filter overlying the perforate filter support and the flat sealing surface, the exposed surface of said filter support comprising upstanding rib means defining a flat filter supporting surface and continuous channel means below said flat surface, and a plurality of holes extending through said filter support for connecting said channel means to the undersurface thereof with said rib means bridging said holes, said female and male parts being coupled together with the sealing ring axially aligned with said flat sealing surface for pressing the membrane filter into tight sealing contact with said flat sealing surface.

2. A filter holder as defined in claim 1 in which said rib means includes a plurality of concentric segmental ribs for supporting the filter, some of said ribs extending across the holes and forming said bridges.

3. A filter holder unit as defined in claim 2 in which the female part, the male part, and the filter support are formed of molded plastic and are coupled together by threads in screwed connection.

4. A filter holder unit as defined in claim 3 in which the sealing ring is arcuate in cross-section thereby providing substantially line bearing contact with the membrane filter.

5. A perforate rigid filter support comprising a body section, upstanding rib means extending from one side of said body section and terminating in a single plane defining a flat filter supporting surface and continuous channel means below said flat surface extending along the one side of said body section, and a plurality of holes extending through said body section for connecting said channel means to the opposite side of said body section, said rib means including portions thereof bridging said holes.

6. A perforate rigid filter support as defined in claim 5 in which said body section and rib means are formed as an integral structure with the portions of said rib means bridging said holes integral with portions thereof extending along the one side of said body section.

7. A perforate rigid filter support as defined in claim 6 in which said rib means include one rib completely encircling the one side of said body section at the periphery thereof and a plurality of segmented ribs disposed within the boundary defined by said one rib.

References Cited

UNITED STATES PATENTS

| | | | |
|---|---|---|---|
| 294,244 | 2/1884 | Lewis et al. | 210—445 X |
| 572,009 | 11/1896 | Herbert | 210—445 X |
| 2,646,678 | 7/1953 | Standing et al. | 210—445 |
| 3,271,999 | 9/1966 | Dwyer et al. | 73—61 |
| 2,449,238 | 9/1948 | Lightfoot | 210—455 X |
| 2,879,207 | 3/1959 | Poitras | 210—406 X |

REUBEN FRIEDMAN, *Primary Examiner.*

F. A. SPEAR, *Assistant Examiner.*